US011946749B2

(12) United States Patent
Cserna et al.

(10) Patent No.: US 11,946,749 B2
(45) Date of Patent: Apr. 2, 2024

(54) DRIVING DATA GUIDED SPATIAL PLANNING

(71) Applicant: Motional AD LLC, Boston, MA (US)

(72) Inventors: Bence Cserna, East Boston, MA (US); Tianyi Gu, Dover, NH (US); Eric Wolff, Boston, MA (US); Elena Corina Grigore, Boston, MA (US); Mochan Shrestha, Blawnox, PA (US)

(73) Assignee: Motional AD LLC, Boston, MA (US)

( * ) Notice: Subject to any disclaimer, the term of this patent is extended or adjusted under 35 U.S.C. 154(b) by 109 days.

(21) Appl. No.: 17/200,050

(22) Filed: Mar. 12, 2021

(65) Prior Publication Data

US 2022/0290997 A1  Sep. 15, 2022

(51) Int. Cl.
*G01C 21/34* (2006.01)
*B60W 60/00* (2020.01)

(52) U.S. Cl.
CPC ....... *G01C 21/3407* (2013.01); *B60W 60/001* (2020.02); *G01C 21/3453* (2013.01)

(58) Field of Classification Search
CPC ........... G01C 21/3407; G01C 21/3453; B60W 60/001; G05D 1/0246; G05D 1/0253; G05D 1/0274; G05D 2201/0215; G06F 16/24; G06F 16/24578; G06F 16/29; G06F 16/444; G06V 10/22; G06K 9/6201; G09B 29/007
See application file for complete search history.

(56) References Cited

U.S. PATENT DOCUMENTS 10,969,238 B2   4/2021   Miyazaki et al.
2012/0121161 A1* 5/2012   Eade .................... G05D 1/0253
                                                            901/1

(Continued)

FOREIGN PATENT DOCUMENTS

JP   2012-190405   10/2012
JP   6777151       10/2020

(Continued)

OTHER PUBLICATIONS

Gallager, Robert G. "Gaussian Random Vectors and Processes." Research Laboratory of Electronics at MIT, https://www.rle.mit.edu/rgallager/. (Year: 2020).*

(Continued)

*Primary Examiner* — Kenneth J Malkowski
*Assistant Examiner* — Carville Albert Hollingsworth, IV
(74) *Attorney, Agent, or Firm* — Fish & Richardson P.C.

(57) ABSTRACT

Among other things, techniques are described for driver data guided spatial planning. A spatial structure is generated comprising a plurality of nodes connected by edges. At least some of the nodes and edges represent a path to navigate a vehicle from a first point to a second point. Edges of the spatial structure are labeled as useful based on a distance metric. The spatial structure is pruned by removing one or more edges from the spatial structure according to a respective label of the edges, wherein an extent of the removal is based on a predetermined graph size, a predetermined performance, or any combinations thereof to obtain a pruned graph. A path from the first point to the second point on the pruned graph is identified and the vehicle is navigated in accordance with the path from the first point to the second point on the pruned graph.

16 Claims, 17 Drawing Sheets

(56) References Cited

U.S. PATENT DOCUMENTS

| | | | |
|---|---|---|---|
| 2014/0213300 A1* | 7/2014 | Spears | H04W 4/024 |
| | | | 455/456.3 |
| 2015/0247731 A1 | 9/2015 | Itay et al. | |
| 2015/0264532 A1 | 9/2015 | Spears | |
| 2017/0232915 A1* | 8/2017 | Dufford | G01C 21/343 |
| | | | 701/48 |
| 2020/0159216 A1* | 5/2020 | Le | B60W 60/001 |
| 2020/0182633 A1 | 6/2020 | Liu | |
| 2020/0207339 A1 | 7/2020 | Neil et al. | |
| 2020/0393835 A1* | 12/2020 | Gregg | G01C 21/3438 |
| 2020/0409377 A1* | 12/2020 | Ready-Campbell | |
| | | | G05D 1/0246 |
| 2021/0080269 A1* | 3/2021 | Sharma | G06Q 50/30 |
| 2021/0341300 A1* | 11/2021 | Beaurepaire | G01C 21/3492 |
| 2021/0403032 A1* | 12/2021 | Jing | G05D 1/0022 |
| 2022/0274625 A1* | 9/2022 | Garimella | G06N 3/04 |

FOREIGN PATENT DOCUMENTS

| | | |
|---|---|---|
| JP | 2020-190915 | 11/2020 |
| JP | 6823512 | 2/2021 |
| KR | 10-2009482 | 8/2019 |
| KR | 10-2020-0094674 | 8/2020 |

OTHER PUBLICATIONS

Phan-Minh et al., "CoverNet: Multimodal Behavior Prediction using Trajectory Sets," Proceedings of the IEEE/CVF Conference on Computer Vision and Pattern Recognition, Apr. 2020, 10 pages.

\* cited by examiner

DRIVING DATA GUIDED SPATIAL PLANNING

FIELD OF THE INVENTION

This description relates generally to driving data guided spatial planning.

BACKGROUND

Autonomous vehicles have benefits over human driven vehicles, including but not limited to, reducing road fatalities, traffic congestion, parking congestion, and increasing fuel efficiency. In making driving decisions, an autonomous vehicle system typically creates one or more models of the surrounding environment. Various solutions to navigate through the environment generated by the autonomous vehicle system are based on, at least in part, the one or more models. As a result, the model has a direct impact on the quality of solutions generated by the autonomous vehicle system. Moreover, aspects of the model can dictate the computational complexity required to generate solutions.

DETAILED DESCRIPTION

Figure 1:
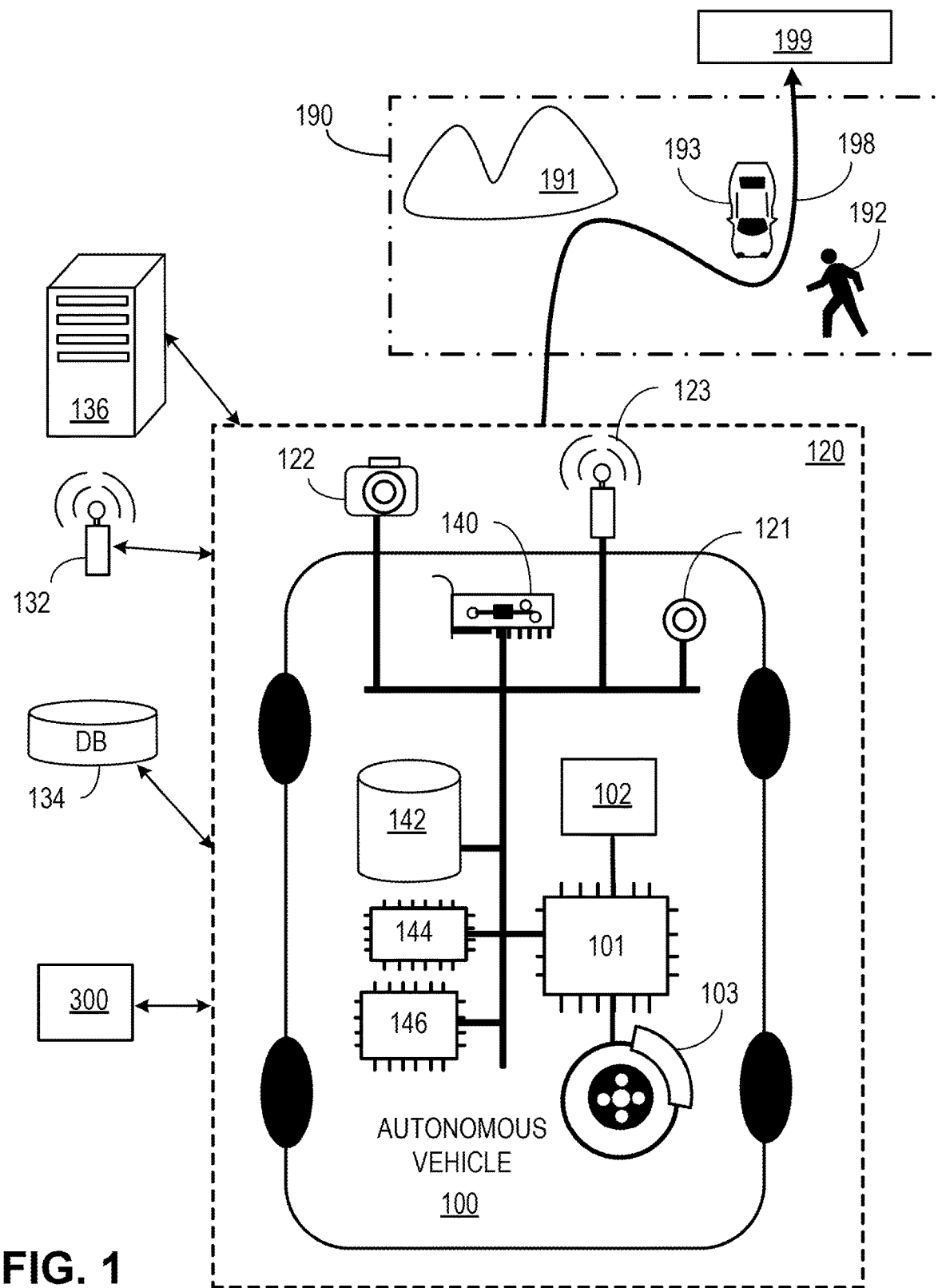
FIG. 1 shows an example of an autonomous vehicle having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. Generation of Spatial Structures
8. Driving Data Guided Spatial Planning System
9. Determination of Useful Edges General Overview A graph representation of a spatial structure can be reduced before using the graph to choose a path for a vehicle to follow. Generally, spatial planning involves generating a spatial structure in which a number of locations throughout the space are represented. The spatial structure may be a graph that can be fitted or mapped to the curvature of a road. A path from a starting point to an ending point is represented by a sequence of edges, where each edge connects a plurality of nodes of the graph. The edges are labeled and statistics derived from at least a distance metric and driver logs. The graph is pruned based on the labels and statistics.

Some advantages of these techniques include reducing the size (or density) of the graph based on a predetermined graph size, a predetermined performance, or a combination of predetermined graph size and performance. The density of the graph is directly proportional to the number of available edges in the spatial structure, and a denser graph yields a higher computational complexity in order to extract satisfactory plans from the directed graph. Driver based statistics as described herein enable a motion planning module to output higher quality paths that replicate human level performance. Further, the time consumed by motion planning is reduced and efficiently used by reducing the space of possible options and focusing on alternatives that yield better planning performance.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
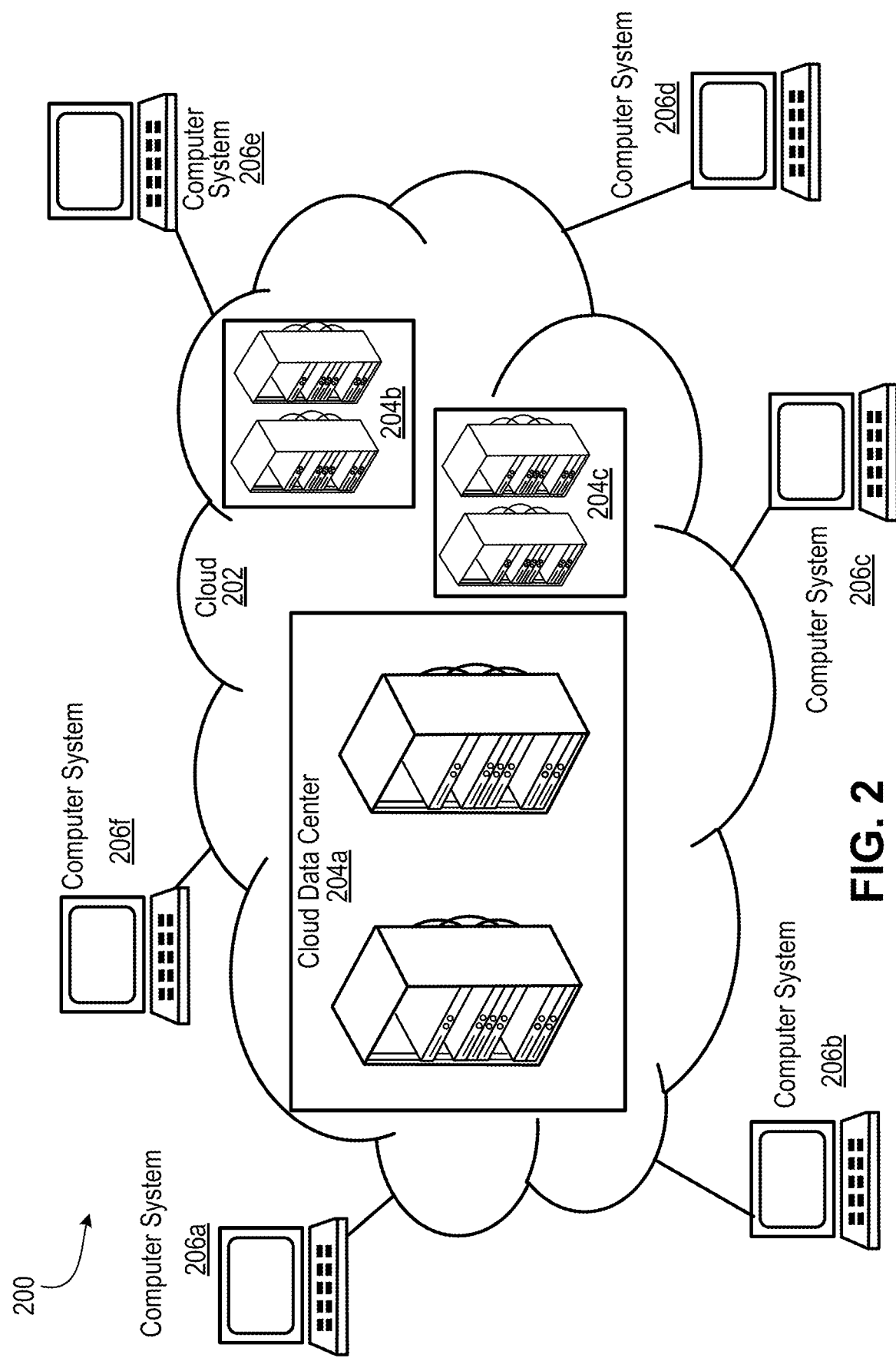
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
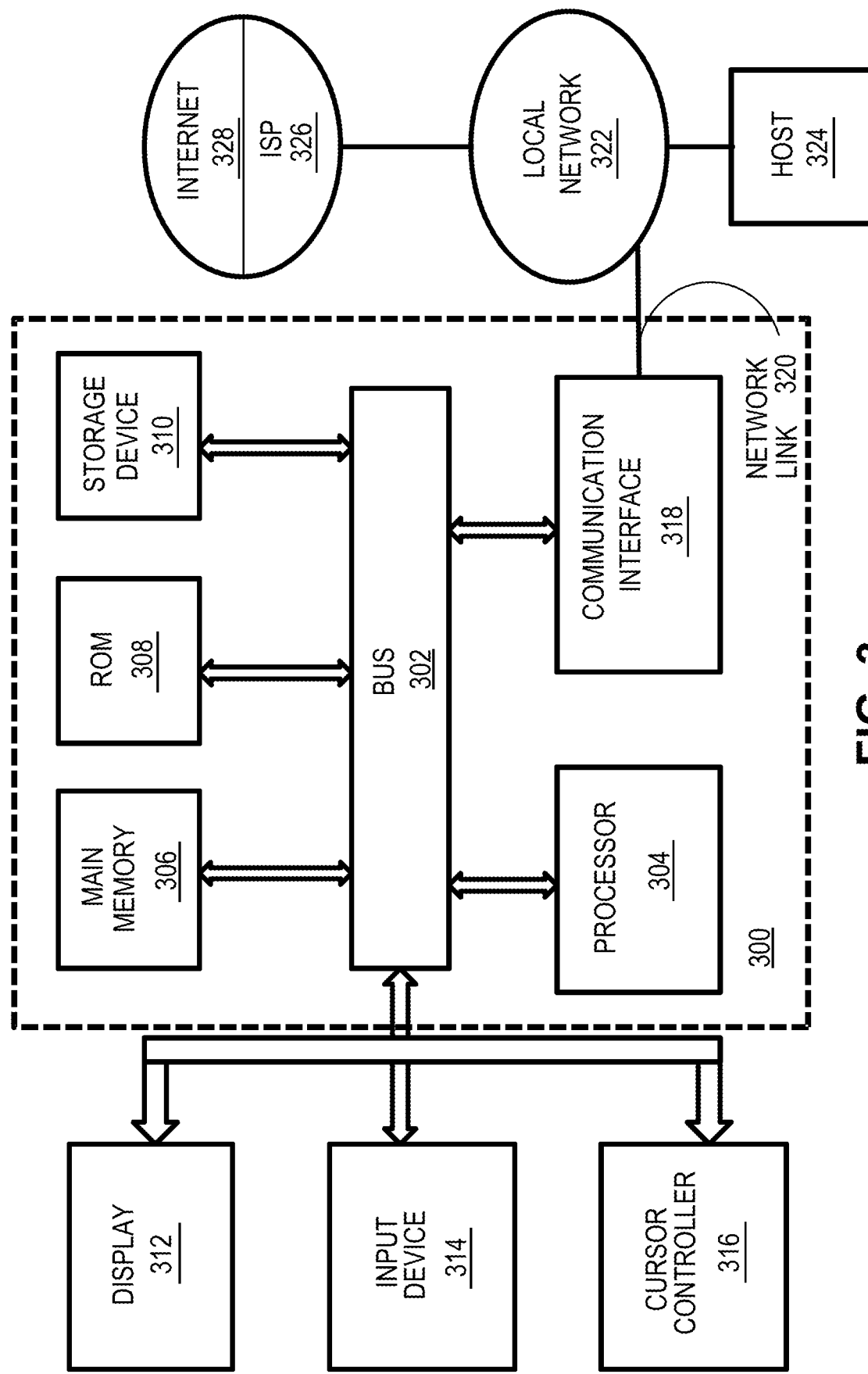
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and uses an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
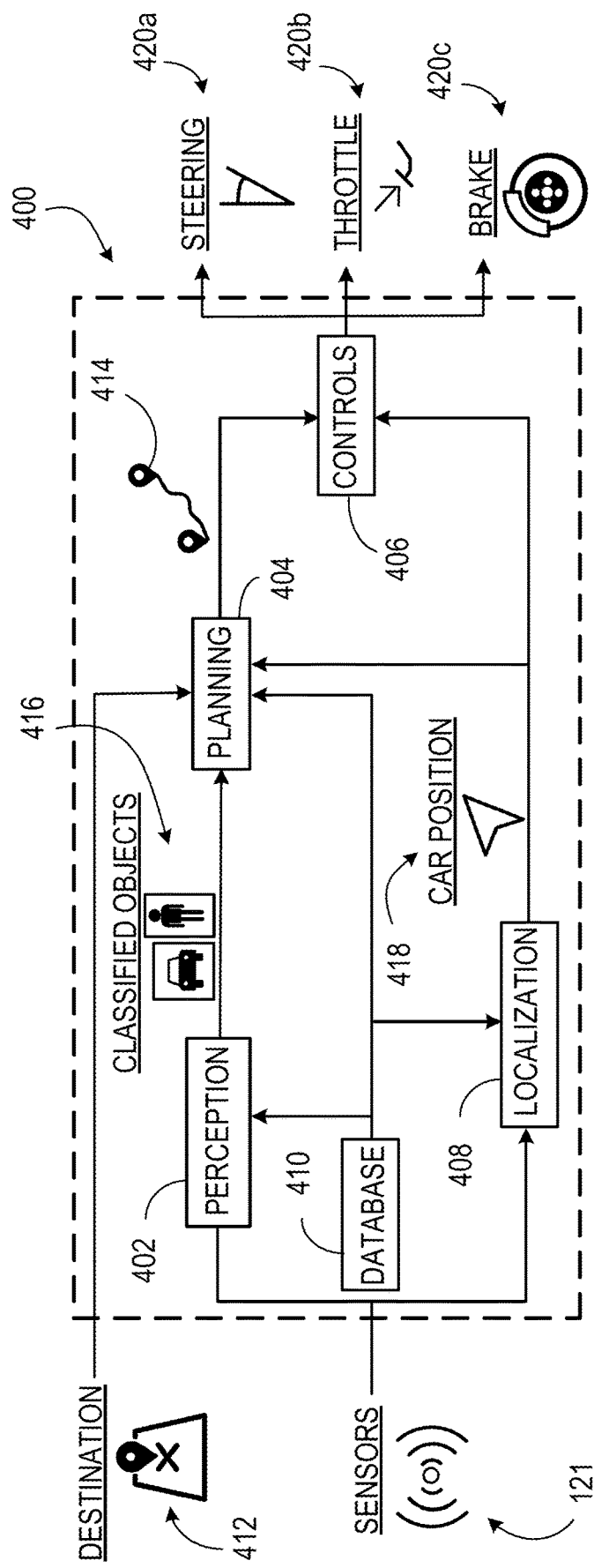
FIG. 4 shows an example architecture for an autonomous vehicle.

FIG. 4 shows an example architecture 400 for an AV (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
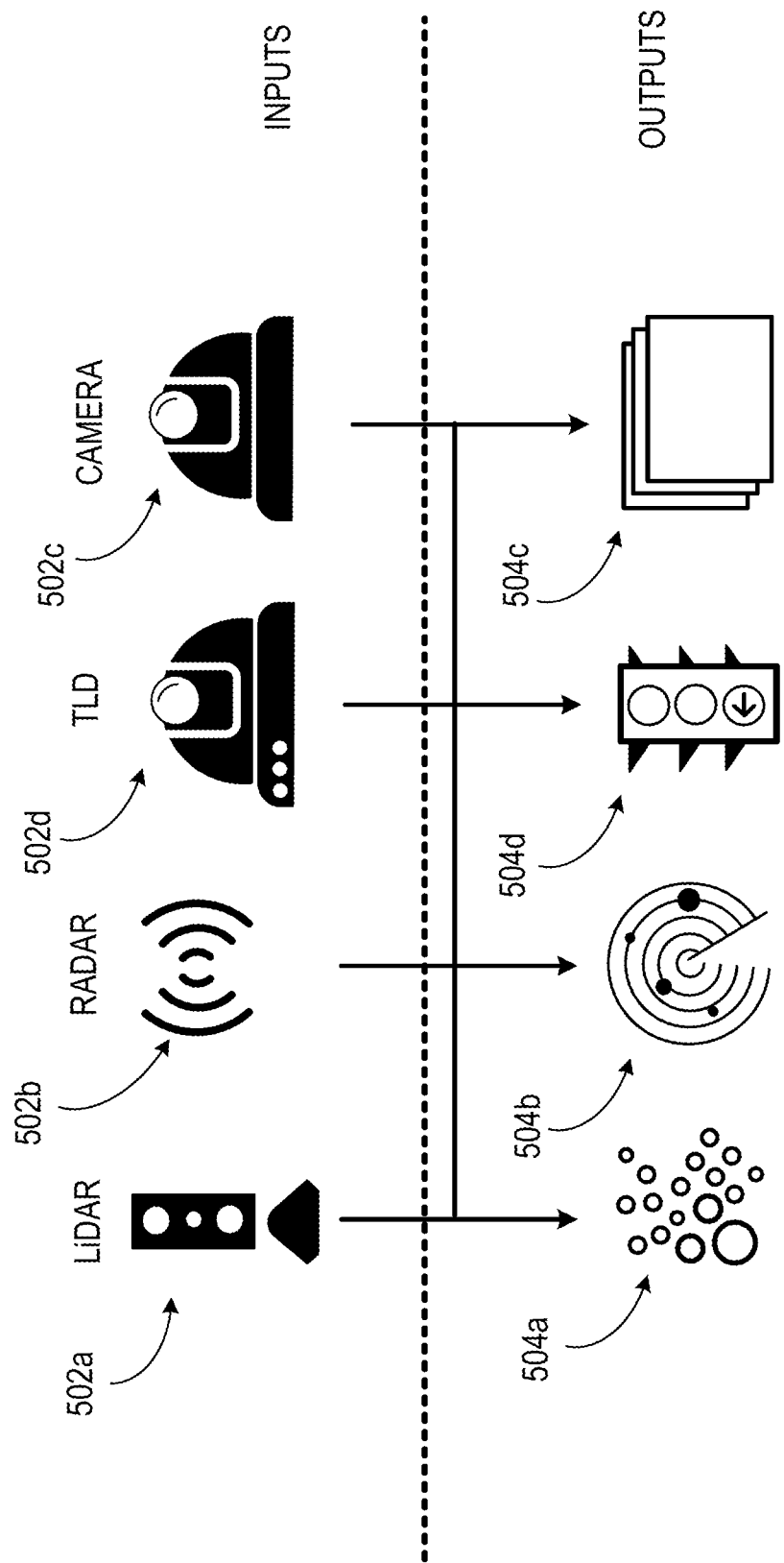
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data)

that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
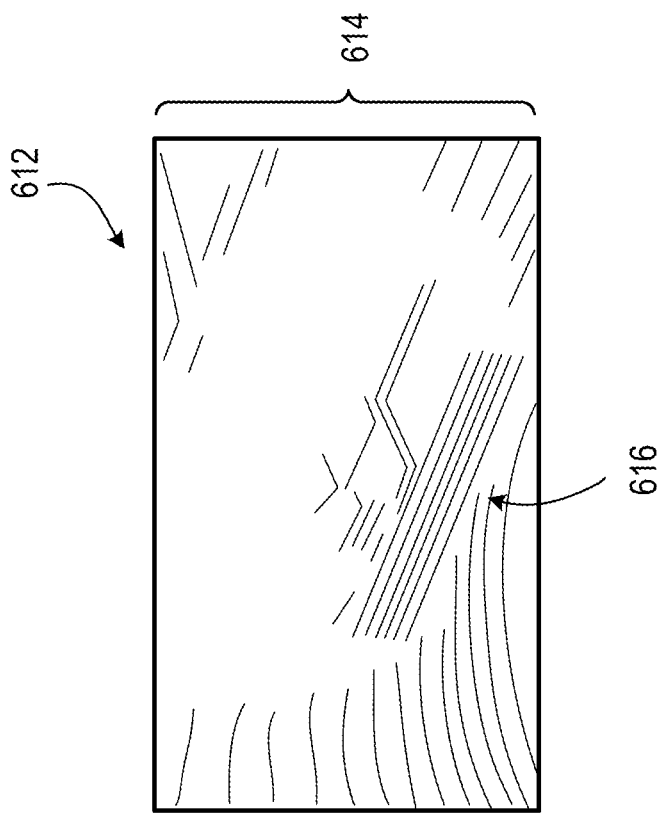
FIG. 6 shows an example of a LiDAR system.
Figure 6:
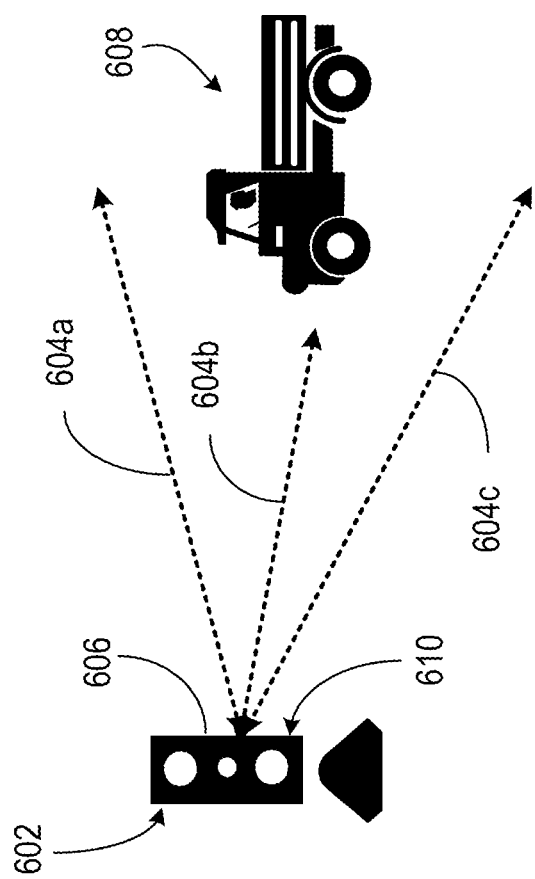

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
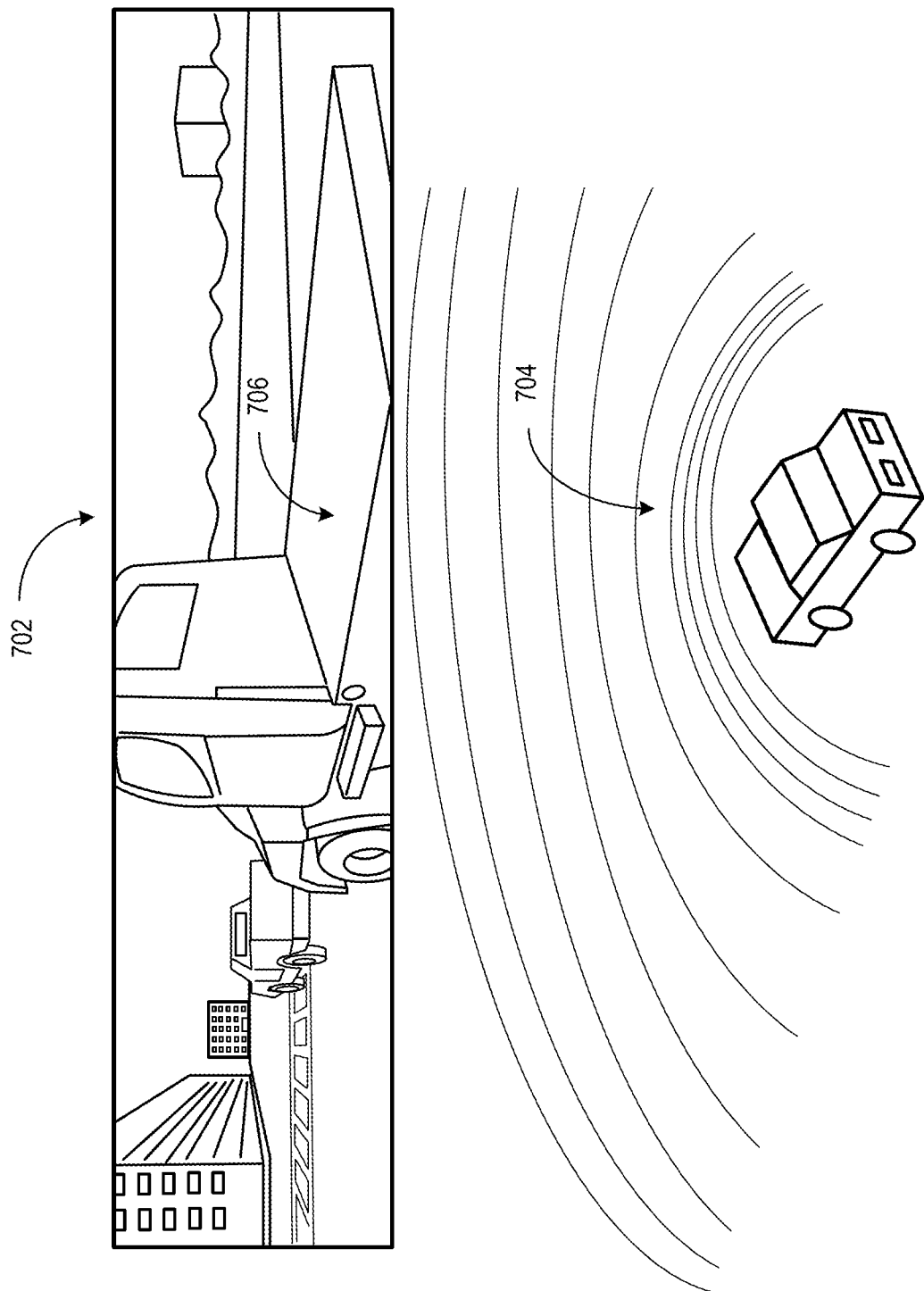
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
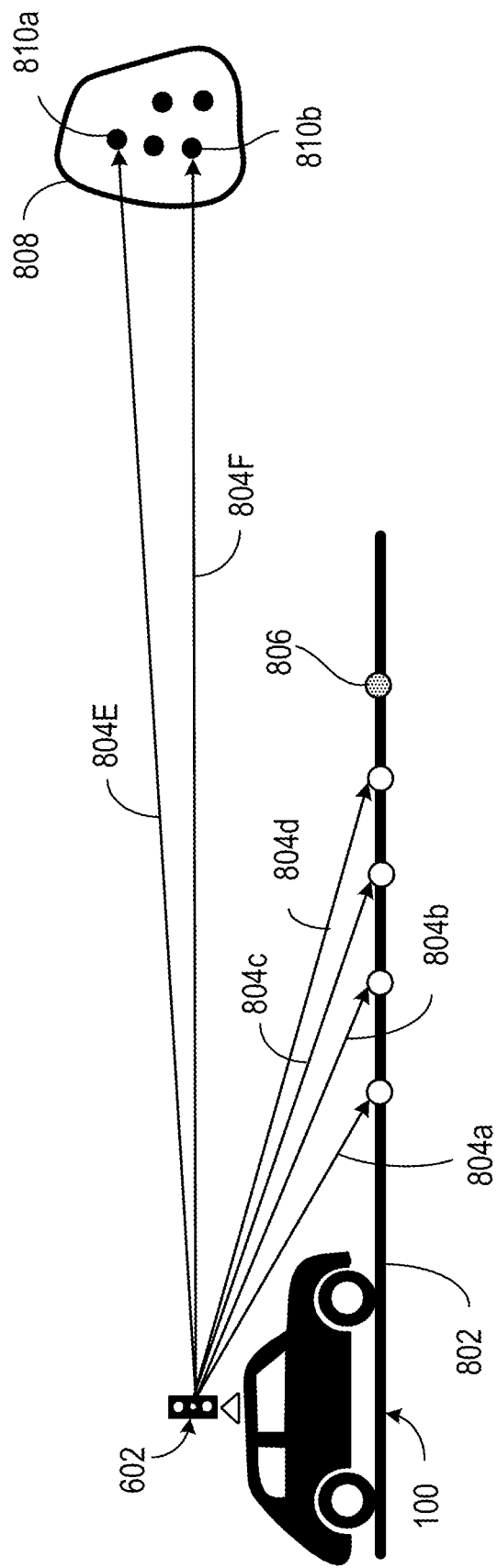
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

AV Planning

Figure 9:
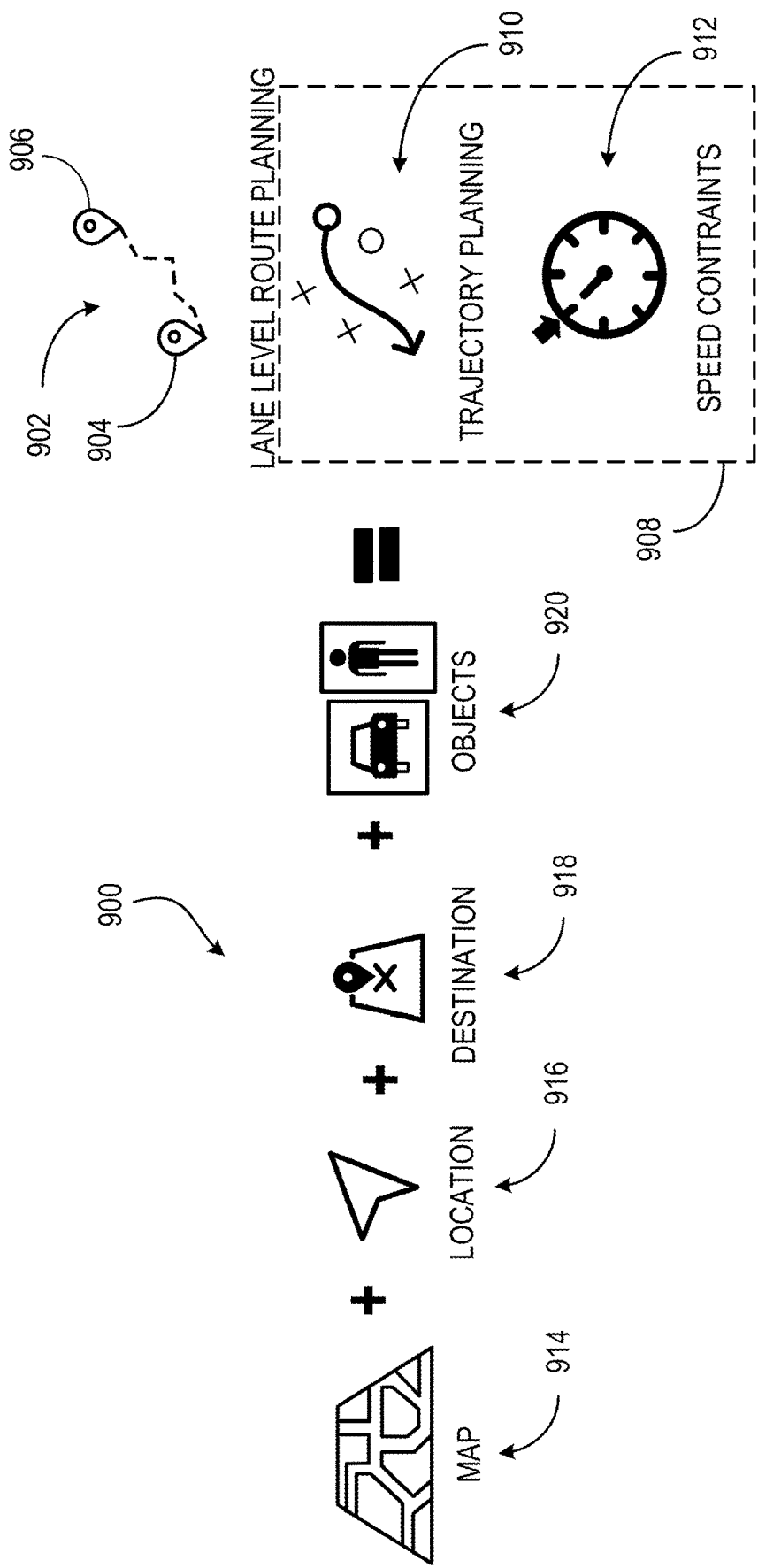
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
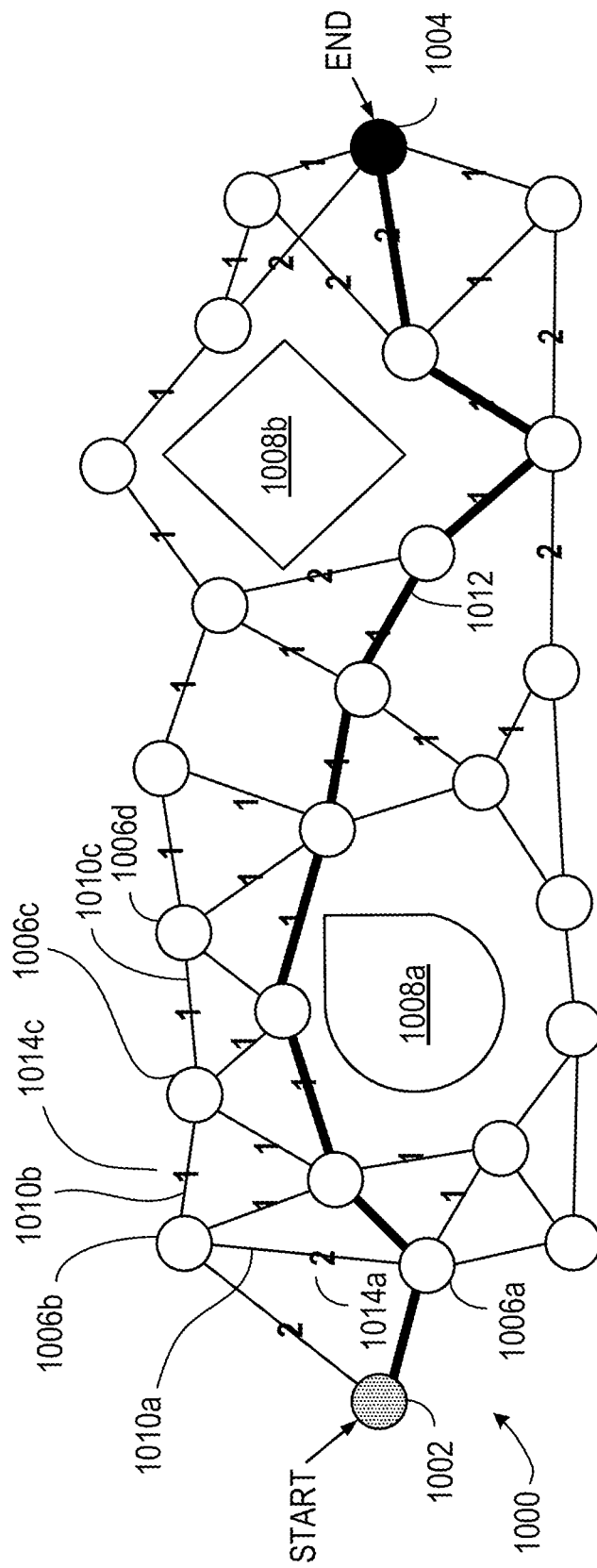
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that a vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

AV Control

Figure 11:
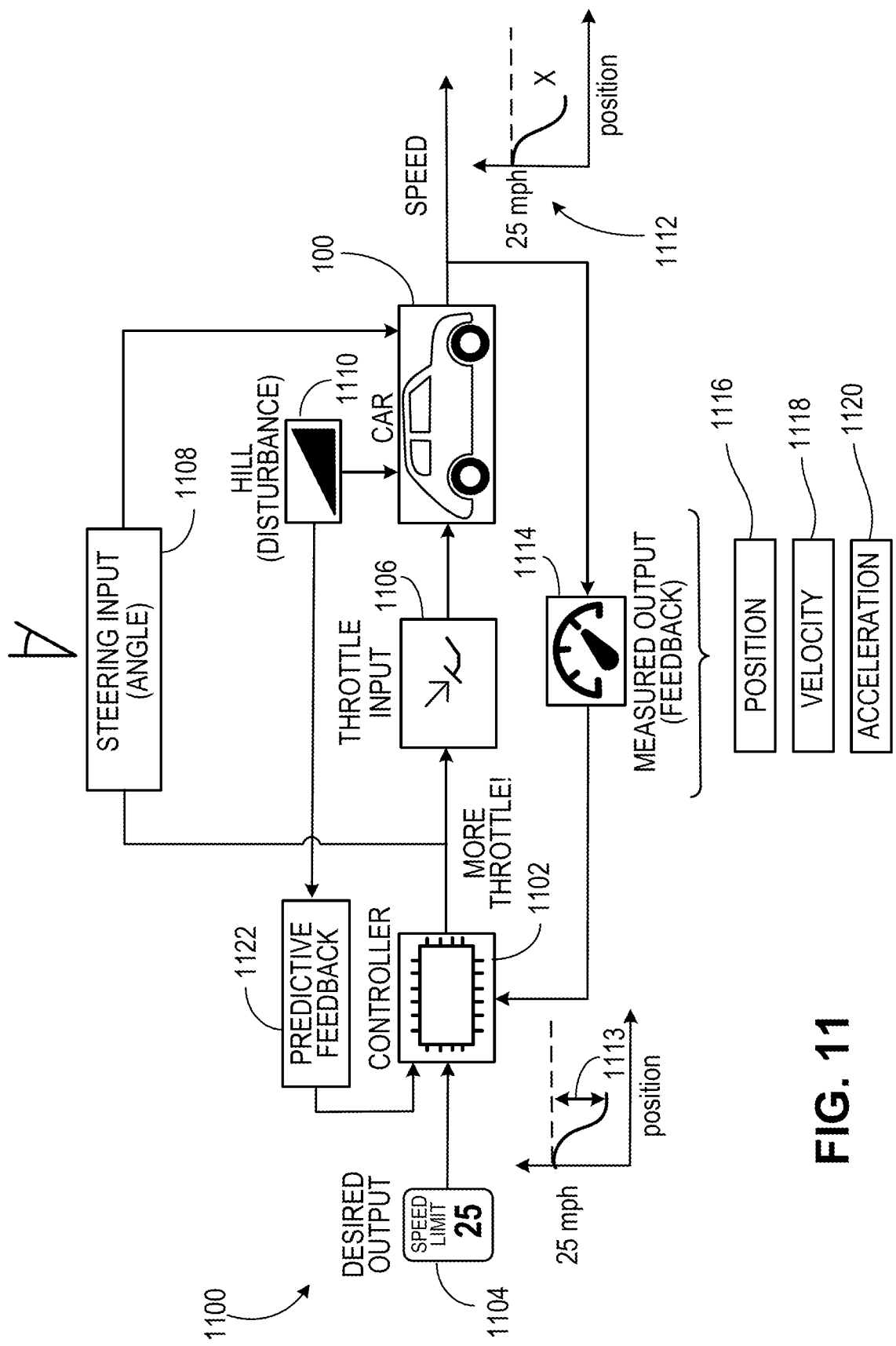
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
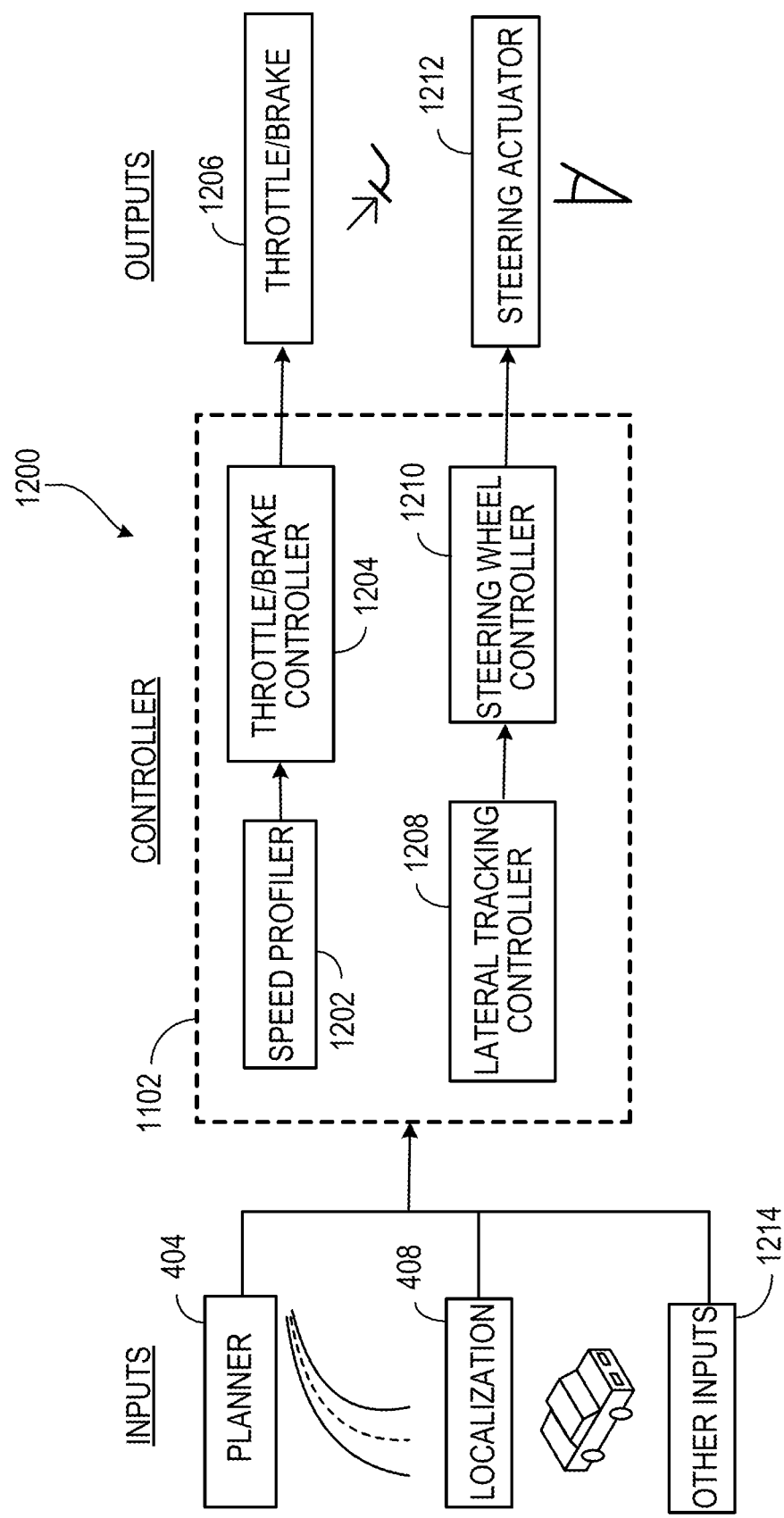
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the vehicle 100 begins operation and to determine which road segment to traverse when the vehicle 100 reaches an intersection. A localization module 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Generation of Spatial Structures

Figure 13:
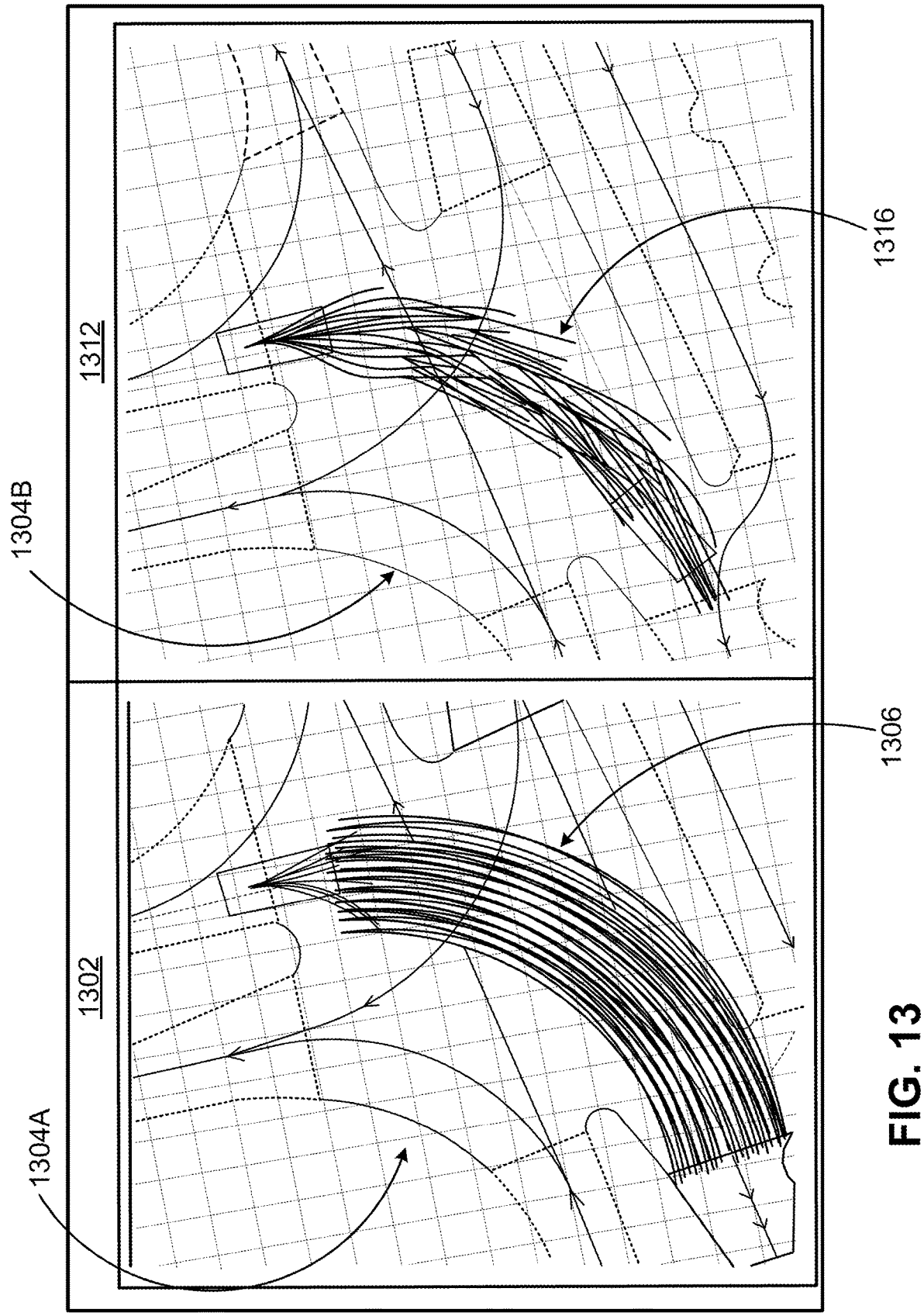
FIG. 13 is an illustration of two spatial structures fit to the curvature of a roadway.

FIG. 13 is an illustration of two spatial structures fit to the curvature of a roadway. In the example of FIG. 13, the spatial structures are spatial graphs. A spatial graph may be a directed graph such as the directed graph 1000 described with respect to FIG. 10. The spatial graph 1302 is illustrated along a roadway 1304A, and the spatial graph 1312 is illustrated along a roadway 1304B. The spatial graphs 1302 and 1312 include a number of edges 1306 and edges 1316 (e.g., edges 1010a-c of FIG. 10), respectively, between a starting point and an ending point. The starting point and the ending point are nodes (e.g., nodes 1006a-d of FIG. 10) of the spatial graph. A planning module (e.g., planning module 404 of FIG. 4) receives a spatial graph as input and determines data representing a trajectory that a vehicle (e.g., vehicle 100 of FIG. 1) can navigate. Accordingly, path from a starting point to an ending point is represented by a sequence of edges, where each edge connects a plurality of nodes of the graph. In an embodiment, an edge represents a series of adjacent locations in space that form a line between a first point and a second point of a spatial graph. In another embodiment, an edge represents an area of locations forming a strip or line with width between a first point and a second point of the spatial graph. For example, a wide edge between a first point and a second point can cover an area around a lane centerline. In some cases, the size of the strip or width of the line is a predefined value.

During path planning, a planning module receives spatial structures, including a destination (e.g., destination data 918 of FIG. 9), and determines data representing a trajectory (e.g., trajectory planning data 910 of FIG. 9) or route that can be traveled by the vehicle to reach (e.g., arrive at) the destination. Put another way, the planning module identifies a path between a starting point and an ending point that the vehicle can traverse. The planning module optimizes the path according to one or more parameters, such as time, cost (e.g., cost 1014a-b of FIG. 10), traffic, number of intersections, speed limit, temporary obstacles, or any combination thereof. The spatial structure used for planning has a direct impact on the performance of a planning module. Generally, a dense graph will yield trajectories that more closely approximate human driving behavior when compared to trajectories derived from a less dense graph. However, a extracting a final trajectory from a dense graph requires a higher level of computational complexity and other work from the planning module. The higher computational complexity is a result of a higher number of possible trajectories available when using a dense graph. Moreover, dense graphs typically cannot yield optimal plan solutions in real time.

In comparison with the graph 1302, the graph 1312 has been pruned or reduced to include edges that are determined to be relevant to the vehicle or otherwise useful. By reducing the edges in a graph to those edges determined to be relevant, useful, or otherwise important to path planning, the subsequent computations performed by a planning module are also reduced. Trajectories derived from a reduced graph that includes edges labeled as useful exhibit the same high quality as trajectories derived from a dense graph.

Generally, an edge is labeled as useful if the edge meets or exceeds a threshold applied to edges of the spatial graph. In an example, the threshold is based on a cost (e.g., cost 1014a-b of FIG. 10) associated with the edge, the number of times the edge is found in human driving data, or any combinations thereof. Otherwise, the edge labeled as not useful. In an embodiment, an edge is labeled as useful according to the road geometry, including lane centerlines. For example, edges that fall below a predetermined maximum distance to the lane centerline are labeled as useful, while edges above the predetermined maximum distance to the lane centerline are labeled as not useful.

In an embodiment, an edge is labeled as useful or not useful by comparing the edge with actual human driving data and based on, at least in part, a distance metric. Human driving data represents a ground truth or an ideal expected result when a vehicle traverses a physical area. Human drive data can be stored in drive logs. In an embodiment, machine learning techniques are used to label an edge as useful or not useful. For example, a classification module is executed to classify each edge as useful or not useful. The classification of each edge as useful or not useful is associated with a confidence score that represents the likelihood of the classification being correct.

The graphs of FIG. 13 are not intended to indicate that the graphs 1302 and 1312 are to include all of the components shown in FIG. 13. Rather, the graphs 1302 and 1312 can include fewer or additional components not illustrated in FIG. 13 (e.g., additional roadways, edges, nodes, etc.). The graphs 1302 and 1312 may include any number of additional components not shown, depending on the details of the specific implementation. Furthermore, any of the graph generation may be partially, or entirely, implemented in hardware and/or in a processor. For example, the functionality may be implemented with an application specific integrated circuit, in logic implemented in a processor, in logic implemented in a specialized graphics processing unit, or in any other device.

Driving Data Guided Spatial Planning System

Figure 14:
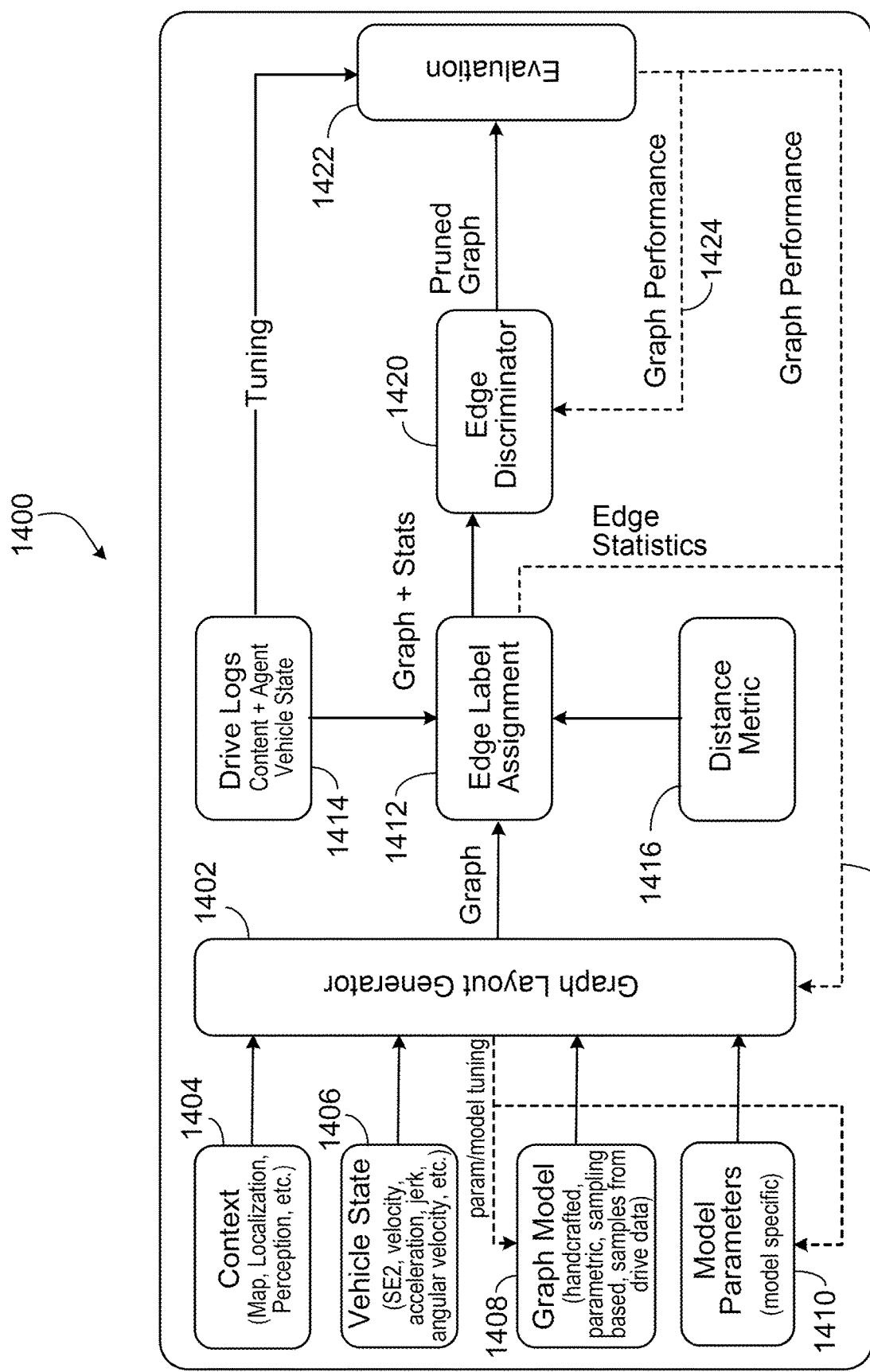
FIG. 14 is a block diagram of a driving data guided spatial planning system.

FIG. 14 is a block diagram of a driving data guided spatial planning system 1400. The spatial planning system 1400 is used to produce a reduced spatial structure that includes useful edges. The graph layout generator 1402 generates a spatial graph layout that covers a space well without any concern as to the size or density of the spatial structure. Generally, coverage refers to the ability to represent all possible paths throughout a space. The graph output by the graph layout generator 1402 may be referred to as an original graph, and is derived using any number of techniques, either alone or in combination. In an embodiment, the original graph is dense when compared to the pruned spatial graph described herein. To generate a spatial graph, the graph layout generator receives as input a context 1404, a vehicle state 1406, a graph model 1408, and model parameters 1410. In embodiments, the graph layout generator 1402 also receives feedback 1418. Based on this input, the graph layout generator 1402 generates a spatial graph (referred to as an original graph) that depicts the underlying model in view of the inputs.

The context 1404 is a set of external conditions applicable to a vehicle (e.g., vehicle 100 of FIG. 1), which can be captured by any number of variables. For example, a map provides context such as a representation of the environment, such as the applicable physical area or roadway. Localization provides context such as a determination of a position within the environment, while perception enables context such as a determination of other data in the environment, including objects (e.g., objects 1008a-b of FIG. 10) with which the vehicle cannot share physical space. In an embodiment, a graph layout can be generated either statically (e.g., using fixed road geometry and driving statistics), dynamically (e.g., using current dynamic state of all other road users and dynamic changes in the lane boundaries from construction zones), or by any combinations thereof. For example, in a static graph layout generation, the graph generated by the graph layout generator is detached from actual road conditions. In a dynamic graph layout generation, road conditions dictate the graph generation.

The vehicle state 1406 is also used as input to the graph layout generator 1402. The vehicle state 1406 is a set of internal conditions applicable to the vehicle. The vehicle state includes, for example, pose (i.e., x, y, heading), velocity, acceleration, jerk, angular velocity, and the like. Further, the vehicle state includes an orientation of the vehicle, its relative angle to the road, a current acceleration and velocity, horizontal jerk, and lateral jerk. In an embodiment, the vehicle state 1402 is used to determine various aspects of the spatial structure output by the graph layout generator 1402. For example, the speed of the vehicle can result in the removal of physically infeasible edges from the spatial structure, such as high-curvature edges. Generally, a higher-speed vehicle cannot successfully navigate high-curvature edges, as the speed would cause the vehicle to be physically unable to maintain the path. A spatial structure generated by the graph layout generator 1402 for a higher-speed vehicle will have high-curvature edges that cannot be successfully or safely traversed removed from the graph. Conversely, a spatial structure for a slower speed vehicle includes high-curvature edges, since a lower speed enables the vehicle to navigate tighter curves.

A graph model 1408 is also provided as input to the graph layout generator 1402. The graph model represents a number of data points that represent edges and vertices of a graph, such as the graphs 1000, 1302, and 1312. This data can be obtained using any number of techniques. For example, the graph model is handcrafted. In a handcrafted model, various parameters are tuned according to an interpretation of how the vehicle operates along a roadway. The model then is propagated over the space to be covered. In a parametric model, parameters are defined that dictate the resulting model. The parameters of the parametric model map the surrounding environment (e.g., environment 190 of FIG. 1) to a set of nodes and connected edges. In an embodiment, the graph model 1408 is sample based, where a collection of vertices and edges that can be used to successfully traverse the space are determined. Additionally, driving data is obtained from human drivers and that data can be sampled to extract a graph model. In an embodiment, the human driver data is randomly sampled to generate a graph model. Other techniques used to determine a graph model 1408 include control techniques to provide uniform coverage and the use of a non-linear program created to generate the graph model. In an embodiment, a machine learning based model is executed to generate the graph model.

The model parameters 1410 are defined for the graph model. Model parameters are specific to each type of graph model 1408. For example, model parameters include particular samples (e.g., samples relative to a location on the map or a part of the graph), sample count, sample density, a minimum or maximum distance between nodes, a minimum or maximum branching factor, and the like. Generally, the model parameters characterize the spatial aspects of the particular graph model.

The graph output by the graph layout generator 1402 is input to an edge label assignment 1412. For ease of description, the graph output by the graph layout generator 1402 is a spatial structure referred to as the original graph. During the edge label assignment, edges of the original graph are labeled. Edges of the original graph are labeled by classifying each edge of the plurality of edges as useful or not useful. An edge is labeled as useful or not useful based on, at least in part, a distance metric 1416. In an embodiment, the distance metric 1416 is a motion prediction model. In an example, the distance metric 1416 is a probability distribution as described by Covernet: Multimodal behavior prediction using trajectory sets; T. Phan-Minh, E. C. Grigore, F. A. Boulton, O. Beijbom, and E. M. Wolff; Proceedings of the IEEE/CVF Conference on Computer Vision and Pattern Recognition, pp. 14074-14083 (2020).

Generally, the distance metric 1416 is a multi-modal, probabilistic prediction of the future states of a vehicle. The distance metric 1416 calculates a distribution of likely trajectories based on the original graph and drive logs 1414, including a current state of the vehicle as described by the vehicle state 1406. The distance metric 1416 measures how closely an edge replicates a driving data sample (e.g., drive logs 1414). For example, the distance metric takes as input a graph edge and at least a portion of a drive log trajectory and outputs a measure of how closely the edge corresponds to the portion of the drive log trajectory. Put another way, the distance metric calculates an overlap between the edge and the corresponding portion of the drive log trajectory. In an embodiment, the measure of how closely the edge corresponds to a portion of a drive log trajectory is averaged for all corresponding portions of trajectories in the drive logs 1414. In an embodiment, the measure of how closely the edge corresponds to a portion of a drive log trajectory is an average distance between the edge and the corresponding portion of a drive log trajectory. The drive logs 1414 include real world driving data, such as past states of all vehicles, pedestrians, bicyclists, etc., and a map. Applying the distance metric 1416 to the drive logs 1414 and the original graph output by the graph layout generator 1402 yields a distribution of likely trajectories with associated probabilities (e.g., likelihoods). In particular, each edge of the original graph is associated with a probability based on a comparison with the corresponding portions of the drive logs 1414.

For example, using a current state of the vehicle, the original graph, and drive logs, a dynamic trajectory set is calculated by according to the distance metric. The distance metric yields a set of likely trajectories that are dynamically feasible based on the vehicle's current state. Edges from the original graph output by the graph layout generator 1402 that largely overlap the corresponding portions of the drive logs 1414 result in a lower distance metric, as an average distance between the edge and the corresponding portions of the drive logs is low due to the higher level of overlap. Thus, edges with an average distance metric that is less than a predetermined threshold are labeled as useful edges. Edges from the original graph output by the graph layout generator 1402 with an average distance metric that is more than the predetermined threshold are labeled as not useful.

In the example of FIG. 14, edges of the original graph output by the graph layout generator 1402 are labeled as useful or not useful based on a motion prediction model. However, in an embodiment, other factors are analyzed to determine if an edge of the graph output by the graph layout generator is useful. The other factors can be used to override the classification of an edge as useful or not useful. The other factors can also be analyzed in combination with the output of the motion predication model. For example, an edge is useful if the edge meets or satisfies a threshold applied to edges of the spatial graph. An edge is also useful according to the road geometry, including lane centerlines.

The original graph generated by the graph layout generator 1402 and the labels derived by the edge label assignment 1412 are provided as input to the edge discriminator 1420. At the edge discriminator 1420, edges are pruned from the received graph based on the labels. In particular, if an edge is labeled as not useful during edge label assignment 1412, the edge is pruned from the graph at the edge discriminator 1420. By pruning edges labeled as not useful, edges of the original graph are ignored when an average distance of those edges from real world driving data (e.g., drive logs 1414) is relatively high. An edge that generally does not overlap sample data is ignored.

In an embodiment, the edge discriminator 1420 prunes edges of the original graph based on one or more factors. For example, an edge that was never matched to driving data samples (e.g., drive logs 1414) is removed. In another example, a planning module (e.g., planning module 404 of FIG. 4) prescribes a maximum number of K edges for the reduced graph. In this example, the K connected edges with a lowest distance metric are retained in the reduced graph and the remaining edges are removed. In another example, the K connected edges for which an overall performance of the graph is the highest are retained. Specifically, when multiple edges have a higher distance metric, removing one or more of the edges with a higher distance metric can change other factors associated with the remaining edges that are retained in the final graph. In an embodiment, adaptive edge removal is performed via an iterative algorithm that removes one or more edges and reevaluates the performance of the edges in the remaining graph. In this embodiment, a reduced graph is selected by selecting the graph with a highest performance as edges are adaptively removed from the graph.

The reduced graph is input to an evaluation 1422. Pruning the original graph is a strategic removal or reduction of edges and nodes from the original spatial graph generated by the graph layout generator 1402. The pruning is based on a predetermined graph size, a predetermined performance, or any combinations thereof. In an embodiment, machine learning models are used to prune the graph. The evaluation 1422 determines an actual performance of the reduced graph in view of the performance of the full, original graph generated by graph layout generator 1402. In an embodiment, performance is a measure of the accuracy or precision associated with the pruned graph's ability to replicate human expert trajectories as found in the drive logs 1414. Thus, in an embodiment, the performance is a measure of the routes (as found in the drive logs 1414) that can be accurately reproduced using the pruned graph for motion planning. In an embodiment, the performance is a measure of how precisely the trajectories generated using the pruned graph replicate ground truth trajectories found in the drive logs 1414. Graph performance includes a measure of the edge types that occur most frequently during motion planning or an area of the reduced graph that was used more frequently used in motion planning. In an embodiment, the performance of the pruned graph is determined by executing a motion planning module using the reduced graph as input. The strength of this discrimination in removing edges from the original graph is adjusted based on the drive logs 1414.

In a feedback loop 1418, the graph layout generator 1402 is provided the edge statistics calculated by edge label assignment 1412 as well as the graph performance of the pruned graph from the evaluator 1422. The edge statistics include, but are not limited to, the probability associated with the edge as determined by the distance metric 1416, usefulness based on an edge type, or any combinations thereof. In an example, the graph performance is quantified by data that indicates a certain type of edge or area of the reduced graph was more frequently used in motion planning than other types of edges or areas. This provides the graph layout generator 1402 with positive feedback on the particular types of edges or other graph data that should be used more frequently in the generation of an original graph when compared with other types of features or graph data. The feedback loop 1418 iterates over various original graphs as generated by the graph layout generator 1402 to improve the graph performance of the resulting reduced graph based on the particular metric used to label edges of the graph. In an example, a preferred edge type is biased as an input to a graph layout generator 1402 in accordance with the statistics and the actual performance of a pruned graph. Biasing the edge type of the layout generates a plurality of candidate graph layouts, and a graph layout of the plurality of candidate graph layouts is selected as a final original graph, to be labeled and pruned as described herein. A second feedback loop 1424 adjusts a discrimination of the edge discriminator 1420 according to the graph performance given the same original graph as output by the graph layout generator 1402. In embodiments, the graph performance is used to iteratively modify the amount or type of edges removed from an original graph at the edge discriminator 1420.

The final pruned graph achieves a large coverage with a smaller or reduced graph size when compared to the original graph generated by the graph layout generator 1402. The spatial graphs are generated based on the context and particular graph model parameters and can be fitted or mapped to the road. The spatial structures are input into a planning module and used to achieve high quality planning solutions. In this manner, the motion planning module is not trained or otherwise modified for the pruned graph generated by the present techniques. In an embodiment, pruned graphs are developed or trained using large amounts of driving data and trained off-line. In other embodiments, the pruned graphs are trained or developed on the fly.

The block diagram of FIG. 14 is not intended to indicate that the system 1400 is to include all of the components shown in FIG. 14. Rather, the system 1400 can include fewer or additional components not illustrated in FIG. 14 (e.g., additional graph layout generator inputs, statistics, labels, feedback loops, etc.). The system 1400 may include any number of additional components not shown, depending on the details of the specific implementation. Furthermore, any of the graph layout generator, edge value assignment, distance metric, edge discriminator, evaluation, and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Determination of Useful Edges

Figure 15:
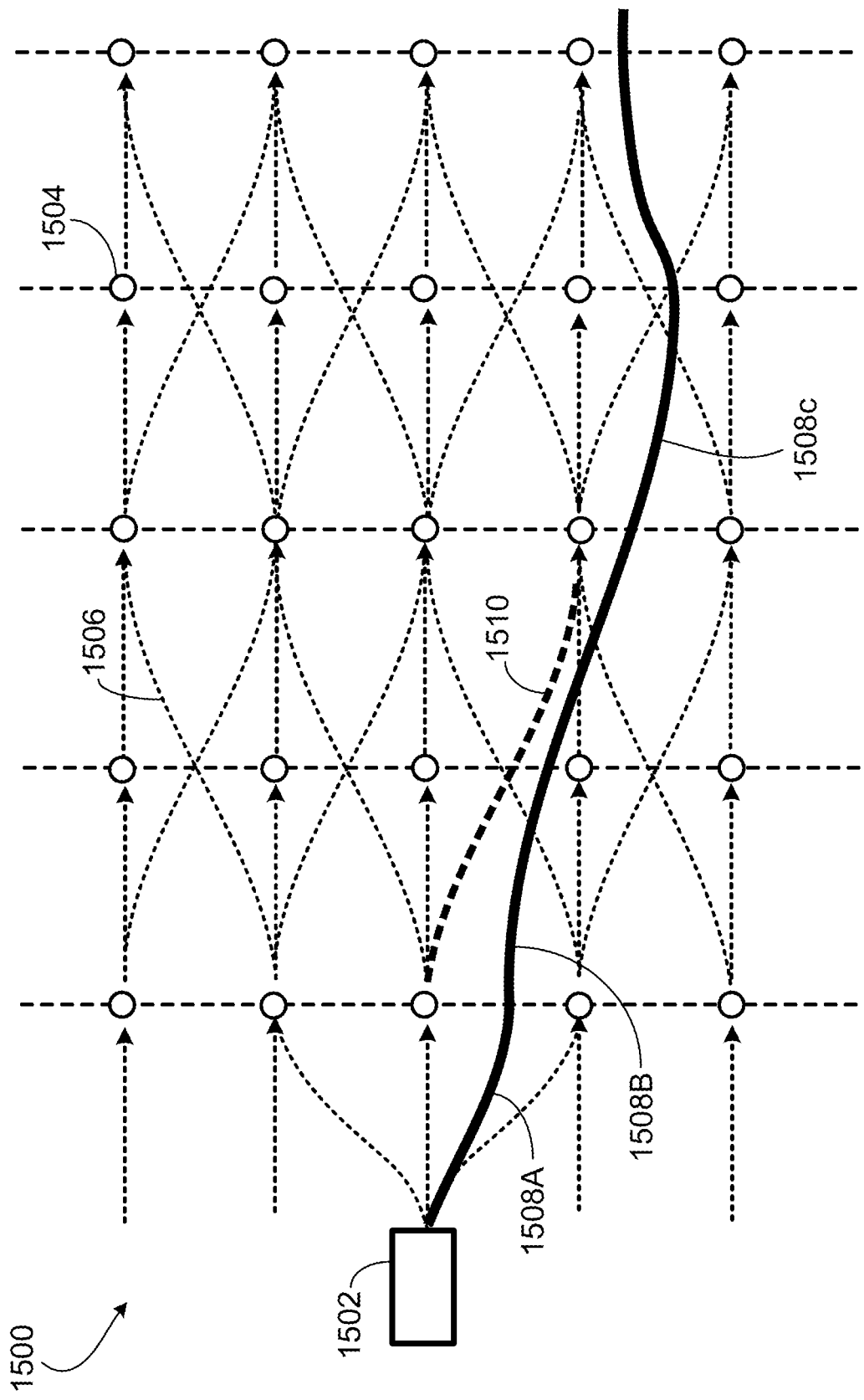
FIG. 15 is an illustration of a spatial structure.

FIG. 15 is an illustration of a spatial structure 1500. In the example of FIG. 15, the spatial structure is generated by a graph layout generator 1402 (FIG. 14). While the spatial structure 1500 is illustrated as a generally rectangular set of nodes 1504 connected by a number of edges 1506, the structure 1500 is fit to the curvature of the respective roadway as described above.

Generally, a planning module (e.g., planning module 404 of FIG. 4) takes a spatial structure as input and creates a path covered by the graph. In embodiments, the present techniques match expert driver data (e.g., drive logs 1414 of FIG. 14) to an original graph (e.g., graph output by graph layout generator 1402 of FIG. 14) to label the edges and derive statistics. The parts of the graph that are most useful in replicating the behavior of human expert drive data are identified. Moreover, parts of the graph that are not contributing to the performance or that cannot replicate the behavior of human expert drive data are also identified. As described above, the graph is pruned based on statistics derived from, at least in part, the distance metric. In an embodiment, the extent of reduction can be controlled by a predetermined graph size or by a predetermined performance.

A vehicle 1502 is illustrated on the left side of the spatial structure 1500. In the example of FIG. 15, the spatial structure 1500 is a graph. The graph includes a number of nodes 1504 and edges 1506. Drive log sample 1508 represents a sample of human expert driving data. The drive log sample data is obtained from drive logs 1414 (FIG. 14). Drive log sample 1508 includes segment lines 1508A, 1508B, and 1508C. To determine useful edges of the graph, the sequence of edges 1506 that most closely match the human expert driving data represented by line 1508 are identified as useful. In an example, edges with a distance to the human expert driving data below a predetermined threshold are labeled as useful and edges with a distance above the predetermined threshold are labeled as not useful. As illustrated, the sequence of edges 1510 of the graph most closely matches the segment line 1508B. For ease of description, a small portion of edges are illustrated as corresponding to a segment line 1508B of drive log sample 1508. However, the correspondences can occur throughout the space and the illustration of the spatial structure 1500 should not be viewed as limiting.

For each drive log sample, the sample is compared to edges of the original spatial structure by starting at a root node of the spatial structure and a corresponding position of the sample. At the root node, edges that are not reachable are ignored. A cumulative cost to replicate the sample is calculated for each path by executing a search from the root node along reachable edges guided by the sample points along the drive log sample. In this manner, costs are computed for various reachable edges that are labeled as useful along a possible path. The path with the lowest cost can be used to guide a selection of the best edge sequence in view of the particular drive sample. The process is repeated for a number of drive log samples. Edges that are deemed unreachable are removed as the best edge sequences in view of drive log samples are calculated. The present techniques do not select single edges based on a distance from a drive log sample for inclusion in the pruned graph. Rather, the present techniques select a sequence of edges in view of a real-world driving sample, where each sequence of edges is compared with other sequences and irrelevant sequences are removed.

In an embodiment, the distance metric enables a determination of the closeness of a sequence of edges to a real world trajectory. The edges are labeled based on the ability of each edge to be included in a sequence of edges that would produce or replicate the current sample most closely. In an embodiment, multiple factors are used to determine the best, most optimized sequence of edges corresponding to each drive log sample. The factors include but are not limited to, for example, a count of how many times an edge was used across all samples or how far an edge was from a sample when it was used in a sequence of edges to replicate the human driving behavior. Additionally, for samples that are not as well covered as other samples, a higher weight is applied to those edges that approximate the not well covered drive log samples. This occurs, for example, in the case of extreme routes or other special, uncommon maneuvers. In embodiments, rare edges are injected into the pruned graph prior to identifying the path from the first point to the second point on the pruned graph. The injection of rare edges provides representation of the extreme routes or other special, uncommon maneuvers in the pruned graph.

The present techniques enable a higher quality coverage and humanlike behavior. The resulting pruned graph is a high coverage sparse spatial structure from which planning modules can output higher quality paths that provide human level performance. Using the drive logs to adjust the pruned graph results in an optimization for frequently occurring scenarios. Moreover, the present techniques enable coverage of rare edge cases such as smooth maneuvers and collision avoidance. Using a large amount of driving data for sampling can also be sufficient in covering rare edge cases including intricate moves. Thus, a large driving data set yields a high quality solution. Planning time is also improved by reducing the space of possible options and focusing on alternatives that yield better planning performance. The present techniques directly optimize for both quality and performance. In embodiments, the present techniques are executed in a server off-line using hundreds or thousands of man-hours driving data. The reduced graphs are accessed by a planning module for use on the fly.

The spatial structure of FIG. 15 is not intended to indicate that the spatial structure 1500 is to include all of the components shown in FIG. 15. Rather, the spatial structure 1500 can include fewer or additional components not illustrated in FIG. 15 (e.g., additional samples, edges, nodes, etc.). The spatial structure 1500 may include any number of additional components not shown, depending on the details of the specific implementation.

Driving Data Guided Spatial Planning

Figure 16:
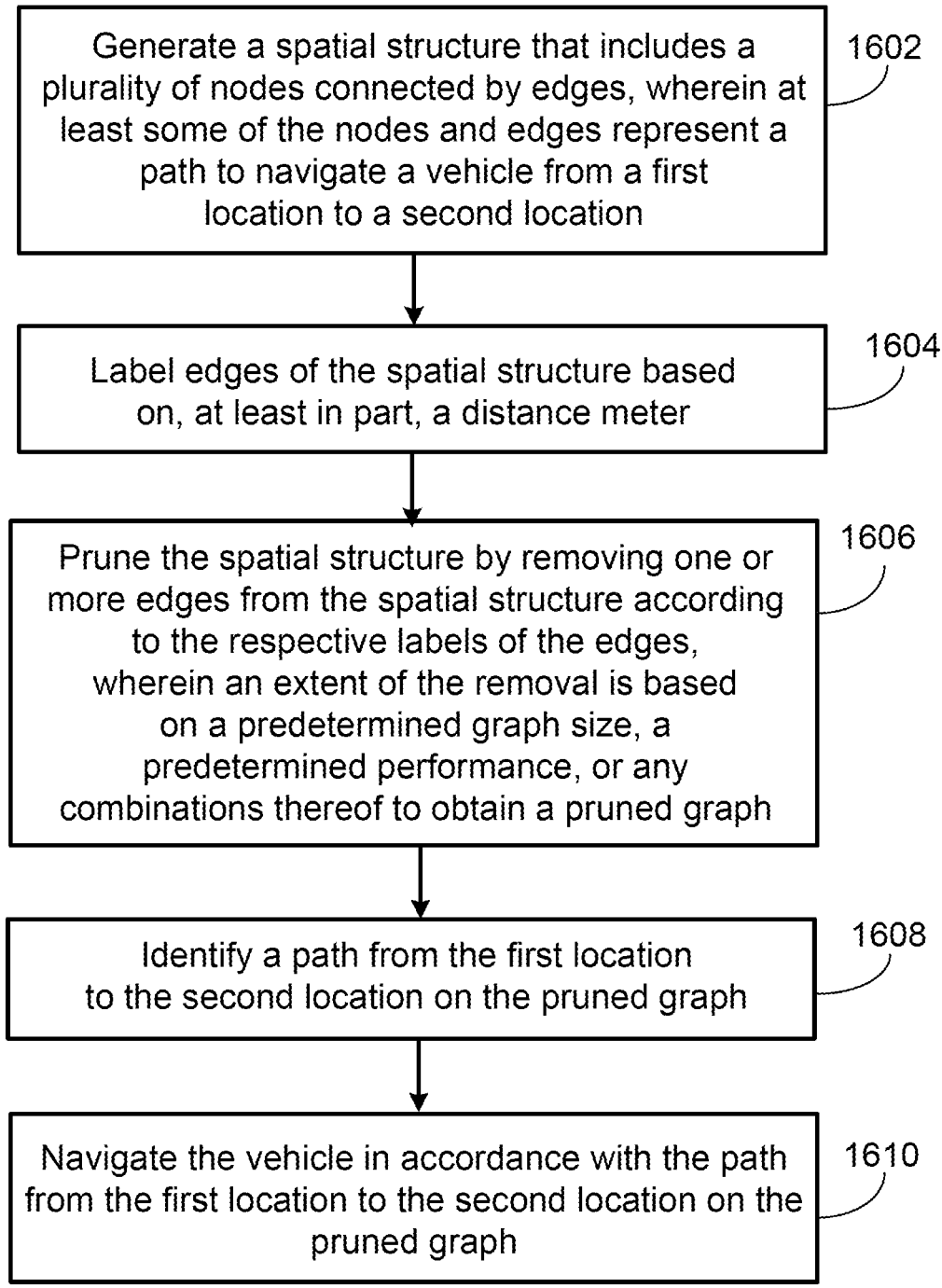
FIG. 16 is a process flow diagram of a process that enables driving data guided spatial planning.

FIG. 16 is a process flow diagram of a process 1600 that enables driving data guided spatial planning. At block 1602, a spatial structure (e.g., spatial graph 1302 of FIG. 13) is generated using at least one processor. The spatial structure includes a plurality of nodes connected by edges (e.g., edges 1306 of FIG. 13). At least some of the nodes and edges represent a path to navigate a vehicle from a first point to a second point.

At block 1604, edges of the spatial structure are labeled (e.g., edge label assignment 1412 of FIG. 14) using at least one processor. In an embodiment, labeling includes assigning each edge a label of useful or not useful according to a distance metric and a predetermined threshold. In an embodiment, a respective statistic for a respective edge of the edges is derived based on at least in part, the distance metric. In an example, the edge statistics include, but are not limited to, a probability associated with the edge as determined by the distance metric (e.g., distance metric 1416 of FIG. 14), usefulness based on an edge type, or any combinations thereof.

At block 1606, the spatial structure is pruned (e.g., edge discriminator 1420 of FIG. 14) by removing one or more edges from the spatial structure according to a label or a respective statistic of the edges, wherein an extent of the reduction is based on a predetermined graph size, a predetermined performance, or any combinations thereof. In an embodiment, the predetermined graph size is measured by the number of edges K in the graph, the storage requirements of the graph, or any combinations thereof. In an embodiment, performance of the pruned graph is a measure of the accuracy or precision associated with the graph's ability to replicate human expert trajectories as found in the drive logs.

At block 1608, a path is identified from the first point to the second point on the pruned graph. In an embodiment, the path represents a lowest cost path based on data sampled from human expert drive log data. At block 1610, the vehicle is navigated in accordance with the path from the first point to the second point on the pruned graph.

The process flow diagram of FIG. 16 is not intended to indicate that the blocks of the example process 1600 are to be executed in any order, or that all of the blocks are to be included in every case. Further, any number of additional blocks not shown may be included within the example process 1600, depending on the details of the specific implementation.

Figure 17:
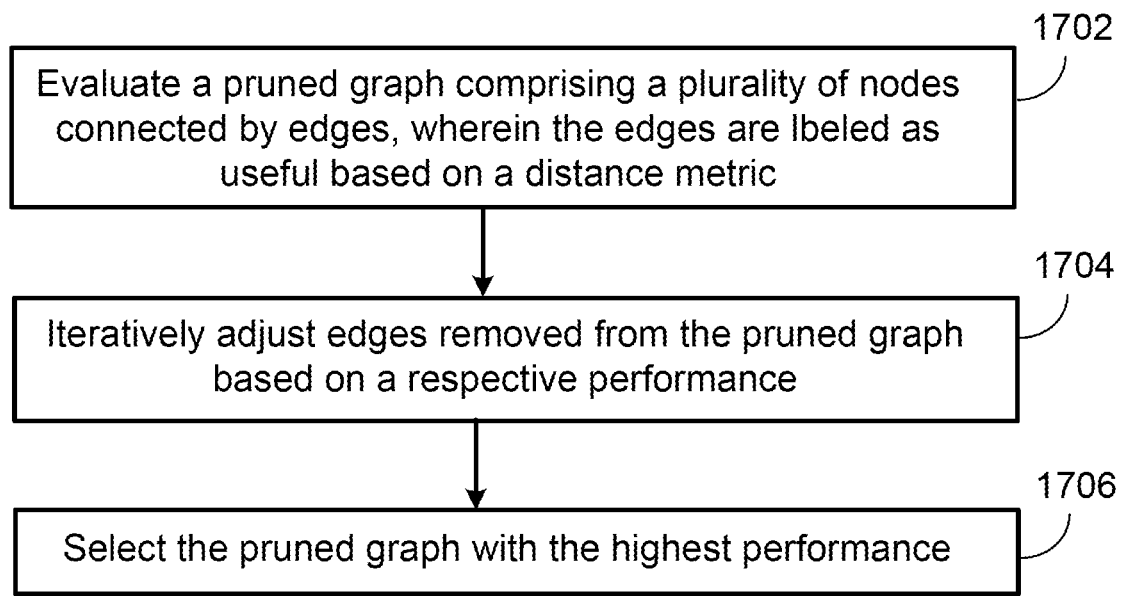
FIG. 17 is a process flow diagram of a process that provides feedback during driving data guided spatial planning.

FIG. 17 is a process flow diagram of a process 1700 that provides feedback during driving data guided spatial planning. At block 1702, drive logs and a pruned graph are evaluated (e.g., evaluation 1422 of FIG. 14). In embodiments, the pruned graph is pruned (e.g., edge discriminator 1420 of FIG. 14) in accordance with labels and statistics prior to evaluation.

At block 1704, edges removed from the pruned graph are iteratively adjusted based on a respective performance. In embodiments, drive logs (e.g., drive logs 1414 of FIG. 14) are reproduced over the pruned graph and the extent of one or more edges removed from the pruned graph is adjusted according to a performance of the pruned graph (e.g., feedback loop 1424 of FIG. 14). Generally, reproducing drive log paths using the pruned graph includes using a planning module to recreate drive log paths as in the drive logs. Additionally, adjusting the extent of the removal of the one or more edges from the graph according to a measure of a coverage of the driver log paths by the pruned graph modifies the edges removed from the pruned graph based on the performance of the pruned graph.

At block 1706, the pruned graph with the highest performance is selected for path planning. In an embodiment, edges for which an overall performance of the pruned graph is the highest are retained. Adaptive edge removal is performed via an iterative algorithm that removes one or more edges and reevaluates the performance of the edges in the remaining graph. In this embodiment, a reduced graph is selected by selecting the graph with a highest performance as edges are adaptively removed from the graph. Accordingly, the pruned graph is iteratively pruned in accordance with the statistics. In an embodiment, the extent of a reduction is based on a predetermined graph size, a predetermined performance, or any combinations thereof.

In an embodiment, a preferred edge type is biased as an input to a graph layout generator in accordance with the statistics and an actual performance of a current pruned graph (e.g., feedback loop 1418 of FIG. 14). For example, a graph layout generator (e.g., graph layout generator 1402 of FIG. 14) is provided edge labels and statistics (e.g., edge label assignment 1412 of FIG. 14) as well as the pruned graph performance (e.g., evaluation 1422 of FIG. 14) as input to generate an original graph.

The process flow diagram of FIG. 17 is not intended to indicate that the blocks of the example process 1700 are to be executed in any order, or that all of the blocks are to be included in every case. Further, any number of additional blocks not shown may be included within the example process 1700, depending on the details of the specific implementation.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
obtaining, using at least one processor, a spatial structure comprising a plurality of nodes connected by edges, wherein at least some of the nodes and edges represent a path to navigate a vehicle from a first point to a second point;
labeling, using the at least one processor, edges of the spatial structure as useful, based on, at least in part, a measure of how closely an edge replicates driving data samples from drive logs, wherein an edge is useful when a number of times the edge is found in the driving data samples satisfies a threshold and a sequence of edges is useful when a distance between the sequence of edges and the driving data samples satisfies a predetermined threshold;
pruning, using the at least one processor, the spatial structure by removing at least one edge from the spatial structure according to respective labels of the edges, wherein an extent of the removal is based on a predetermined graph size, a predetermined performance, or any combinations thereof to obtain a pruned graph;
adjusting the extent of the removal of the at least one edge from the spatial structure according to a measure of a coverage of paths in the drive logs by paths recreated on the pruned graph; and
navigating, using the at least one processor, the vehicle in accordance with a path from a first point to a second point representing a useful sequence of edges on the pruned graph.

2. The method of claim 1, wherein obtaining the spatial structure comprises:
biasing an edge type of the spatial structure, wherein biasing the edge type of a graph layout generates a plurality of candidate graph layouts, and a graph layout of the plurality of candidate graph layouts is selected as the spatial structure based on an actual performance of the pruned graph.

3. The method of claim 1, comprising:
labeling edges of the spatial structure as not useful, based on, at least in part, the measure of how closely an edge replicates driving data samples from drive logs; and
pruning the spatial structure by removing edges of the spatial structure labeled as not useful to obtain the pruned graph.

4. The method of claim 1, wherein pruning comprises removing edges from the spatial structure according to at least one factor, wherein the at least one factor overrides a previous label of the edges.

5. The method of claim 1, wherein pruning comprises removing the at least one edge from the spatial structure according to edge statistics.

6. The method of claim 1, wherein an edge represents a series of adjacent locations without width forming a line between the first point and the second point.

7. The method of claim 1, wherein an edge represents an area of locations forming a strip between the first point and the second point.

8. A non-transitory computer-readable storage medium comprising at least one program for execution by at least one processor of a first device, the at least one program including instructions which, when executed by the at least one processor, carry out a method comprising:
obtaining a spatial structure comprising a plurality of nodes connected by edges, wherein at least some of the nodes and edges represent a path to navigate a vehicle from a first point to a second point;
labeling edges of the spatial structure as useful, based on, at least in part, a measure of how closely an edge replicates driving data samples from drive logs, wherein an edge is useful when a number of times the edge is found in the driving data samples satisfies a threshold and a sequence of edges is useful when a distance between the sequence of edges and the driving data samples satisfies a predetermined threshold;
pruning the spatial structure by removing at least one edge from the spatial structure according to respective labels of the edges, wherein an extent of the removal is based on a predetermined graph size, a predetermined performance, or any combinations thereof to obtain a pruned graph;
adjusting the extent of the removal of the at least one edge from the spatial structure according to a measure of a coverage of paths in the drive logs by paths recreated on the pruned graph; and
navigating the vehicle in accordance with a path from a first point to a second point representing a useful sequence of edges on the pruned graph.

9. The computer-readable storage medium of claim 8, wherein obtaining the spatial structure comprises biasing an edge type of the spatial structure, wherein biasing the edge type of a graph layout generates a plurality of candidate graph layouts, and a graph layout of the plurality of candidate graph layouts is selected as the spatial structure based on an actual performance of the pruned graph.

10. A method, comprising:
evaluating, using at least one processor, a pruned graph comprising a plurality of nodes connected by edges, wherein the edges of the pruned graph are labeled as useful based on a distance and driving data samples from drive logs and an extent of removal of at least one edge from a spatial structure to generate the pruned graph is based on a measure of a coverage of paths in the drive logs by paths recreated on the pruned graph;
iteratively adjusting, using the at least one processor, edges selected for removal from the pruned graph based on a respective performance of the pruned graph;
selecting, using the at least one processor, a remaining pruned graph with a highest performance, wherein the respective performance of the pruned graph is evaluated at the iterative adjustments; and
navigating, using the at least one processor, a vehicle in accordance with a path from a first point to a second point on the selected, remaining pruned graph.

11. The method of claim 10, comprising:
generating a spatial structure comprising a plurality of nodes connected by edges, wherein a preferred edge type is biased in accordance with statistics and an actual performance of the pruned graph;
labeling the edges as useful or not useful based on a distance and drive logs;
pruning the spatial structure by removing edges labeled as not useful to obtain a final pruned graph; and
navigating the vehicle in accordance with the path from the first point to the second point on the final pruned graph.

12. The method of claim 10, wherein labeling edges of a spatial structure as useful comprises calculating a respective average distance for the edges of the spatial structure and corresponding portions of trajectories in the drive logs, wherein edges with a respective average distance that satisfies a first predetermined threshold are labeled as useful.

13. The method of claim 10, wherein iteratively adjusting edges removed from the pruned graph based on the respective performance of the pruned graph comprises:
   removing at least one edge from the pruned graph; and
   reevaluating the respective performance of the remaining pruned graph.

14. The method of claim 10, comprising removing edges from the pruned graph to satisfy a predetermined graph size, wherein the predetermined graph size is measured by a number of edges in a graph, a storage requirement of the graph, or any combinations thereof.

15. The method of claim 10, wherein the path from the first point to the second point on the pruned graph is a lowest cost path, wherein a cost of a path is a value that represents resources expended when navigating the vehicle on a respective path.

16. The method of claim 10, wherein performance of the pruned graph is an accuracy of edges in replicating drive log trajectories.

\* \* \* \* \*